(12) United States Patent
Todorovic

(10) Patent No.: US 9,194,397 B2
(45) Date of Patent: Nov. 24, 2015

(54) AIRCRAFT GAS TURBINE WITH ADJUSTABLE FAN

(71) Applicant: Rolls-Royce Deutschland Ltd & Co KG, Blankenfelde-Mahlow (DE)

(72) Inventor: Predrag Todorovic, Berlin (DE)

(73) Assignee: Rolls-Royce Deutschland Ltd Co KG (DE)

( * ) Notice: Subject to any disclaimer, the term of this patent is extended or adjusted under 35 U.S.C. 154(b) by 660 days.

(21) Appl. No.: 13/739,722

(22) Filed: Jan. 11, 2013

(65) Prior Publication Data

US 2013/0230383 A1 Sep. 5, 2013

(30) Foreign Application Priority Data

Jan. 18, 2012 (DE) .................. 10 2012 000 889

(51) Int. Cl.
| | |
|---|---|
| *F04D 19/00* | (2006.01) |
| *F01D 5/30* | (2006.01) |
| *F01D 7/02* | (2006.01) |
| *F02K 3/06* | (2006.01) |

(52) U.S. Cl.
CPC .............. *F04D 19/00* (2013.01); *F01D 5/3007* (2013.01); *F01D 7/02* (2013.01); *F02K 3/06* (2013.01); *Y02T 50/671* (2013.01)

(58) Field of Classification Search
CPC ........... F01D 7/00; F01D 7/02; F04D 29/323; F04D 29/366; F04D 15/0055; F05D 2260/70; F05D 2260/76; B64C 11/30
See application file for complete search history.

(56) References Cited

U.S. PATENT DOCUMENTS

| | | | |
|---|---|---|---|
| 3,720,060 A | | 3/1973 | Davies et al. |
| 4,037,986 A | * | 7/1977 | Chilman ..................... 416/46 |
| 4,124,330 A | * | 11/1978 | Barnes ..................... 416/157 B |
| 4,927,329 A | | 5/1990 | Kliman et al. |
| 2009/0004008 A1 | * | 1/2009 | Richards ..................... 416/145 |
| 2009/0285686 A1 | | 11/2009 | Violette et al. |

FOREIGN PATENT DOCUMENTS

| | | |
|---|---|---|
| DE | 2061425 | 6/1971 |
| DE | 19547695 | 6/1997 |
| FR | 2942645 | 9/2010 |

OTHER PUBLICATIONS

German Search Report dated Sep. 19, 2012 from counterpart application.

* cited by examiner

*Primary Examiner* — Edward Look
*Assistant Examiner* — Christopher J Hargitt
(74) *Attorney, Agent, or Firm* — Timothy J. Klima; Shuttleworth & Ingersoll, PLC

(57) ABSTRACT

The present invention relates to an aircraft gas turbine having a fan rotatable about an engine axis in the inflow region of the aircraft gas turbine, with the fan having several fan blades, with each fan blade being moveably mounted on a hub rotatable about the engine axis by means of its blade root on an area which is at the front in the flow direction, and with each fan blade being moveably mounted on an area at the rear in the flow direction, on an adjusting disk axially displaceable relative to the engine axis and non-rotatable with the hub, with the pitch angle of the fan blades being variable by the axial movement of the adjusting disk.

10 Claims, 6 Drawing Sheets

AIRCRAFT GAS TURBINE WITH ADJUSTABLE FAN

Figure 1:
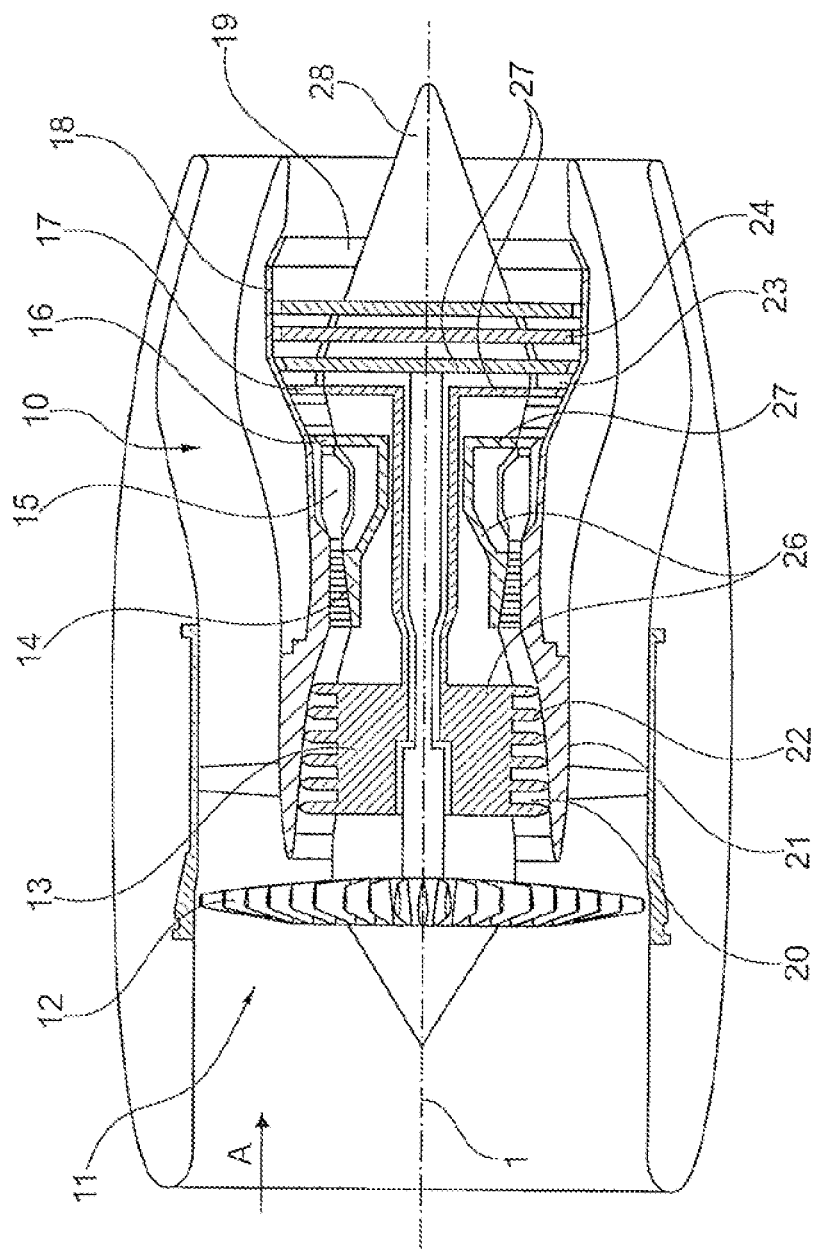

This application claims priority to German Patent Application DE102012000889.9 filed Jan. 18, 2012, the entirety of which is incorporated by reference herein.

This invention relates to an aircraft gas turbine having a fan whose blades' pitch angle is finely adjustable, and in particular to an aircraft gas turbine having a fan arranged in its inflow region, said fan having a hub on which several fan blades are mounted.

The fan of an aircraft gas turbine forms a first compressor area by which inflowing air is compressed and then supplied to a core engine and to a bypass duct.

In the designs known from the state of the art, the blades of the fan are optimized (pitch angle) for a specific engine state (flight mode). By contrast, the efficiency of the fan is not optimum in other engine running conditions (states). These engine states can be, for example, the take-off phase, the cruising phase or the descent phase.

The blades of the fan are optimized by an selection of the most appropriate pitch angle for an desired operating state. In a non-optimized operating state, the pitch angle is usually larger and induces more turbulent flow at certain areas of the fan blade (flow separations). This results in unfavourable effects on the fan blade, which lead to unwelcome vibrations (flutter). These vibrations have a negative effect on the power transmission capacity of the material of the fan blades (fatigue), also causing unwelcome noise. It was attempted in the state of the art to remedy this problem by using heavier and stiffer fan blades. This in turn leads to the necessity of designing the hub of the fan more heavy and more sturdy, too.

The option of rotating a fan blade about a radial axis, like a propeller blade, or a stator vane of a compressor is only possible to a limited extent, since the fan blades are arranged very close to the circumference of the hub, leaving insufficient space available.

A broad aspect of the present invention is to provide an aircraft gas turbine having a fan which, while avoiding the disadvantages of the state of the art enables optimization of the flow conditions of the fan.

It is a particular object of the present invention to provide solution to the above problematics by a combination of the features described herein. Further advantageous embodiments of the present invention become apparent from this description.

It is thus provided in accordance with the invention that each fan blade is moveably mounted on a hub rotatable about the engine axis by means of its blade root on an area which is at the front in the flow direction. The fan blade is further mounted on an area at the rear in the flow direction. On this area, the fan blade is moveably mounted on an adjusting disk axially adjustable relative to the engine axis and non-rotatable relative to the hub. The fan blade thus has two different mounting areas, i.e. a front and a rear mounting area. The front mounting of the fan blade is axially fixed, where the fan blade can, for setting of the pitch angle, rotate slightly about an axis arranged radially to the engine axis. Due to the axial movement of the adjusting disk, which supports a rear area of the fan blade, it is possible to rotate the fan blade in order to change the pitch angle.

The invention is thus based on the underlying idea of changing all fan blades in their pitch angle by means of an easily accomplished axial longitudinal displacement of the adjusting disk. It is clear that the mounting of the fan blade on the adjusting disk is designed such that an axial movement of the adjusting disk is possible and that this axial movement leads to a rotation of the fan blade.

To permit rotation of the fan blade during an axial longitudinal movement of the adjusting disk, it is provided in a preferred development of the invention that the hub has first guide recesses and that the adjusting disk is provided with second guide recesses. Thanks to suitable dimensioning of the guide recesses, which in a favourable development of the invention can also be designed in the form of elongated guideways, rotation of the fan blades can be easily achieved.

It has been shown in accordance with the invention that even a minor longitudinal displacement of the adjusting disk leads to an effective setting of the fan blades.

It is thus possible to achieve by simple means an optimization of the fan for different flight conditions in each case. It is possible by optimizing the pitch of the fan blades to eliminate the vibration problems arising in designs known from the state of the art. It is furthermore possible to design both the fan blades and the hubs with lower weight, thereby reducing the overall weight. This enables the fan to be optimally operated in all operating states (flight envelope) of the aircraft gas turbine. This also results in a considerable noise reduction, since unwelcome vibration and flow states are avoided.

In a particularly favourable development of the invention, it is provided that the blade root includes a first bearing element at the front in the flow direction and a second bearing element at the rear in the flow direction, said elements being arranged in the respective guideways. It is particularly favourable here when the bearing elements are designed substantially in the form of undercut spherical heads and when the guideways are designed in the form of undercut grooves or in a similar manner. This permits a radial mounting and holding of the individual fan blades.

The axial movement of the adjusting disk is achieved, in a preferred embodiment of the invention, by means of a piston/cylinder arrangement. This piston/cylinder arrangement can be formed by at least one bearing which is connected to a bearing oil feed line and to one or more bearing oil return lines. It is thus possible to use the normally provided bearing oil lines and the normally already existing bearing to additionally achieve an adjustment of the fan blades. It is possible here in a particularly simple manner to control the bearing oil return lines using shut-off elements or valves. The pressure in the bearing oil feed line effects a displacement of the bearing, which acts as a double-acting piston of the piston/cylinder arrangement. On the one hand this ensures sufficient bearing lubrication, and on the other hand the oil can be used by the piston/cylinder arrangement for axial displacement of the adjusting disk.

With the solution in accordance with the invention, it is thus possible to achieve actuation of the adjusting disk simply and inexpensively without having to make major changes to the gas-turbine engine as such. It is only necessary to reshape the hub area of the fan and to design the blade roots accordingly. By suitably positioning or dimensioning or designing the adjusting disk, it is possible in accordance with the invention to permit a simple and inexpensive, yet very operationally reliable, setting of the fan blades.

Figure 3:
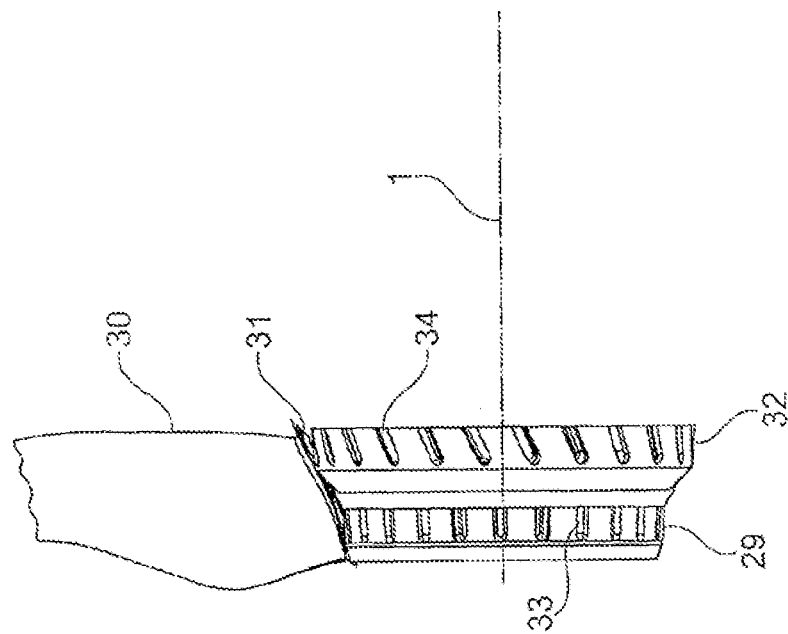
Figure 4:
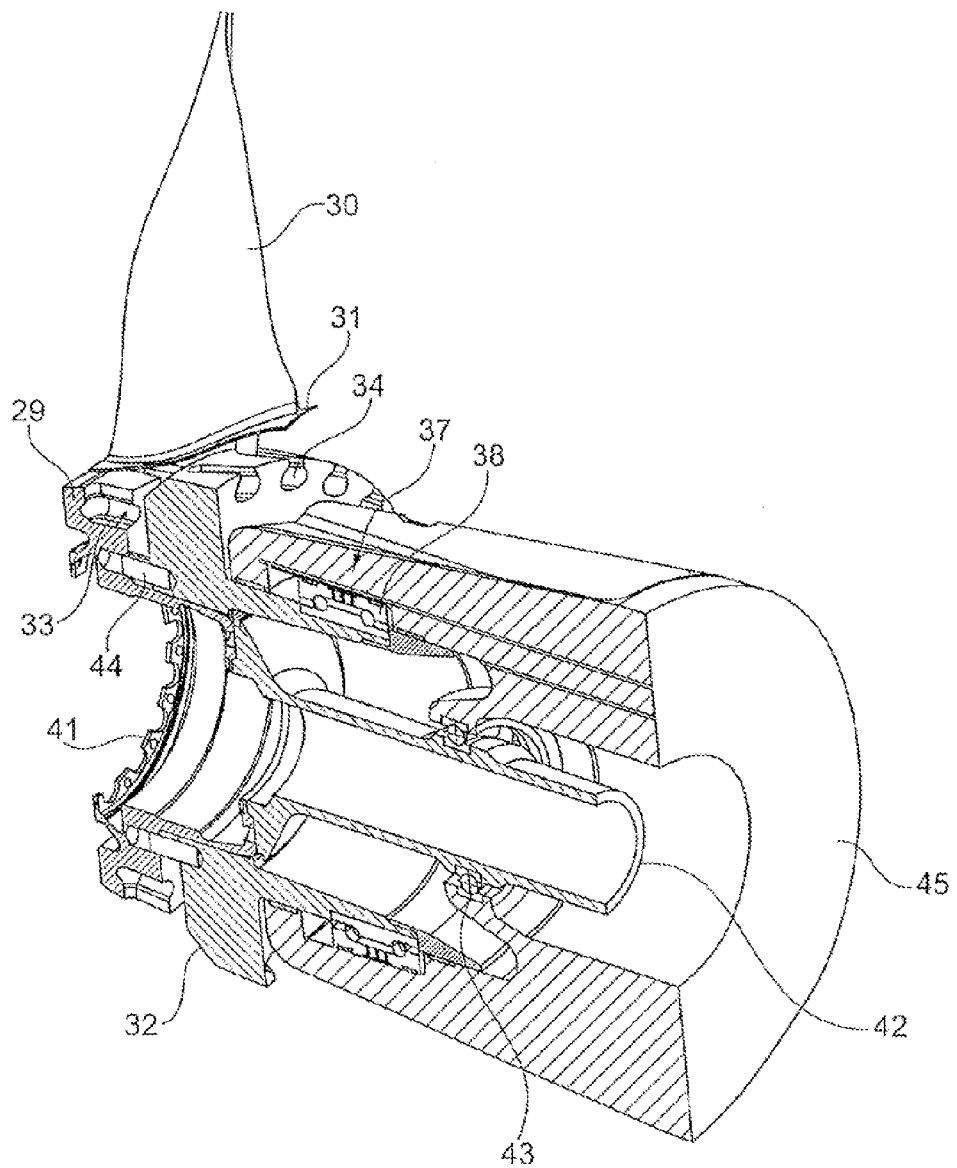
Figure 5:
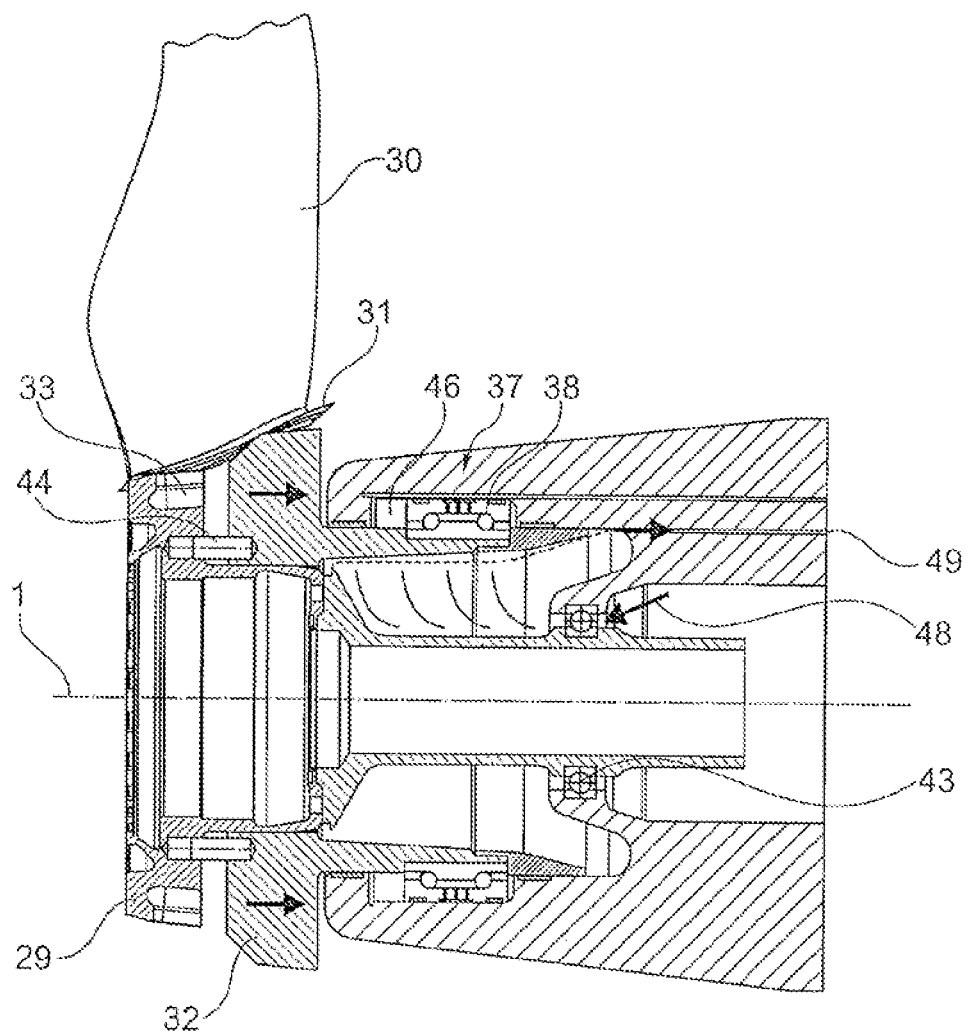
Figure 6:
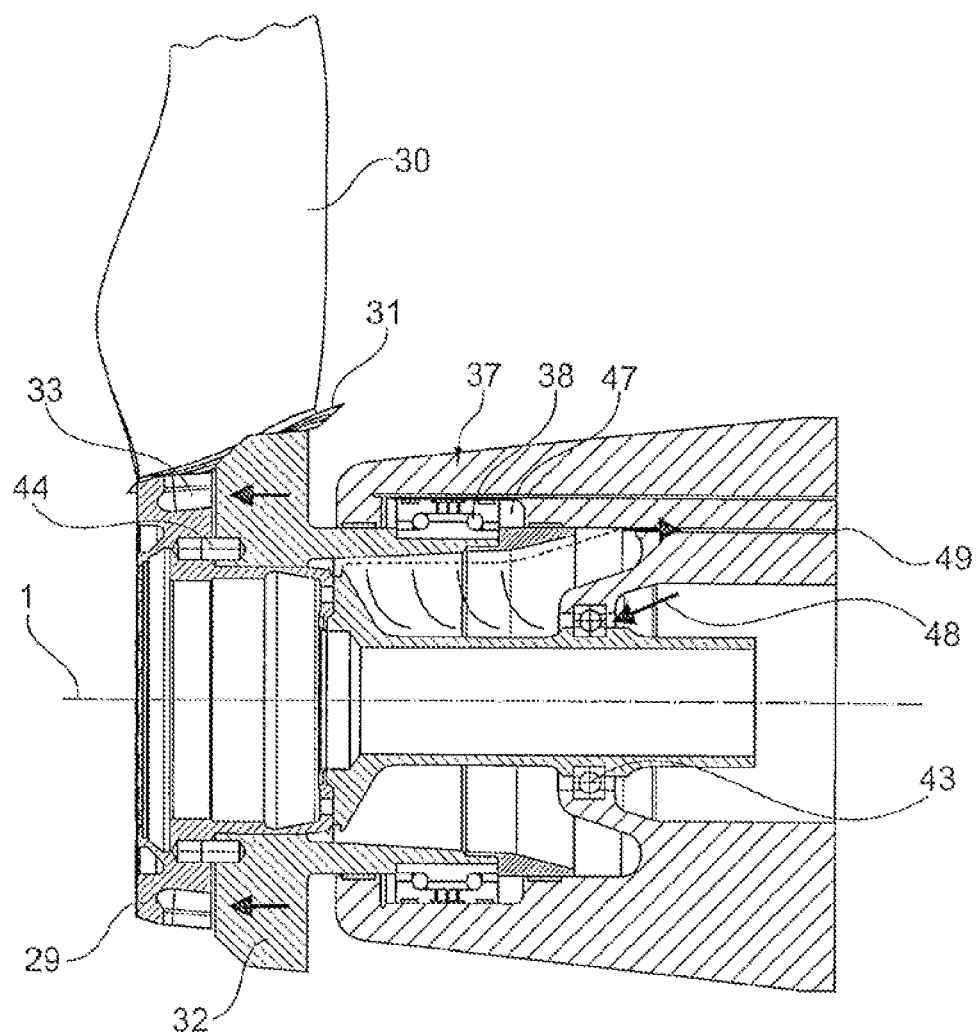
Figure 7:
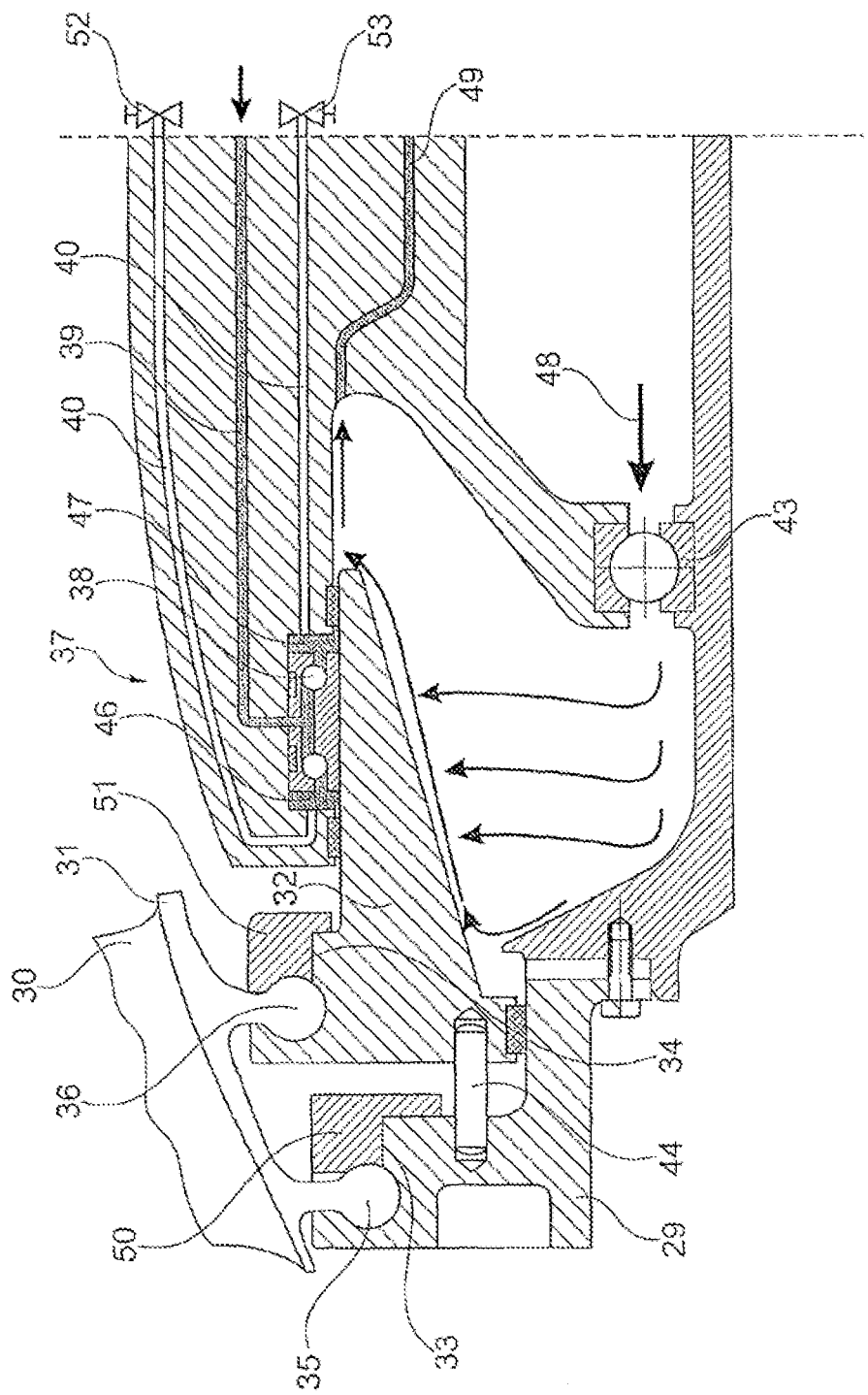

The present invention is described in the following in light of the accompanying drawing, showing exemplary embodiments. In the drawing, FIG. 1 shows a schematic representation of a gas-turbine engine in accordance with the present invention, FIG. 2 shows a schematic side view of an exemplary embodiment of a fan, representing the pitch angle, FIG. 3 shows a schematic partial view of the hub in accordance with the invention and of the appertaining adjusting disk, FIG. 4 shows a simplified perspective sectional view of a first exemplary embodiment of the arrangement in accordance with the invention, FIGS. 5, 6 show sectional views, by analogy with FIG. 4, representing the movement directions and positions of the adjusting disk, and FIG. 7 shows a sectional view, by analogy with FIGS. 5 and 6, of a further exemplary embodiment of the invention.

Figure 2:
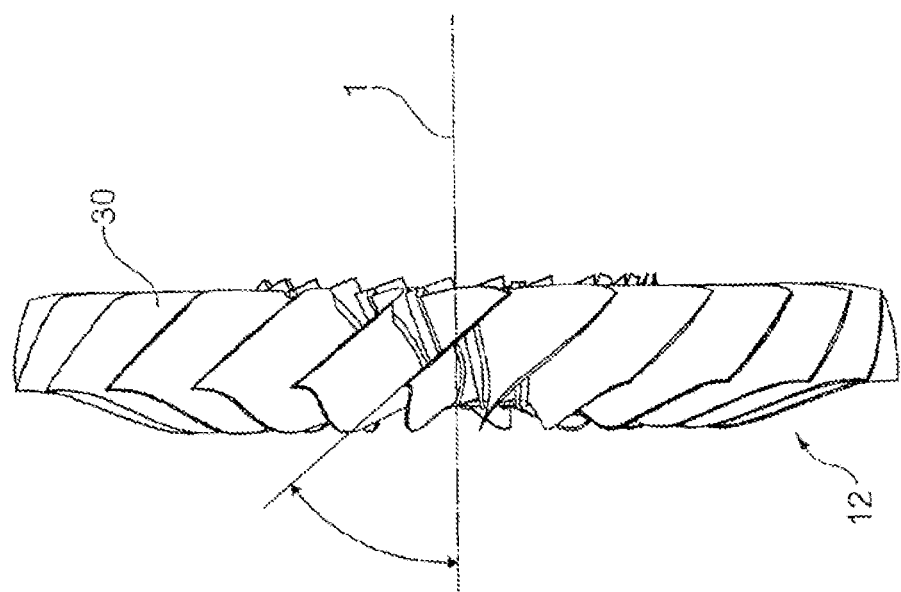

FIG. 1 shows a schematic representation of a gas-turbine engine in accordance with the present invention.

The gas-turbine engine 10 in accordance with FIG. 1 is an example of a turbomachine where the invention can be used. The following however makes clear that the invention can also be used in other turbomachines. The engine 10 is of conventional design and includes in the flow direction, one behind the other, an air inlet 11, a fan 12 rotating inside a casing, an intermediate-pressure compressor 13, a high-pressure compressor 14, combustion chambers 15, a high-pressure turbine 16, an intermediate-pressure turbine 17 and a low-pressure turbine 18 as well as an exhaust nozzle 19, all of which being arranged about a central engine axis 1.

The intermediate-pressure compressor 13 and the high-pressure compressor 14 each include several stages, of which each has an arrangement extending in the circumferential direction of fixed and stationary guide vanes 20, generally referred to as stator vanes and projecting radially inwards from the engine casing 21 in an annular flow duct through the compressors 13, 14. The compressors furthermore have an arrangement of compressor rotor blades 22 which project radially outwards from a rotatable drum or disk 26 linked to hubs 27 of the high-pressure turbine 16 or the intermediate-pressure turbine 17, respectively.

The turbine sections 16, 17, 18 have similar stages, including an arrangement of fixed stator vanes 23 projecting radially inwards from the casing 21 into the annular flow duct through the turbines 16, 17, 18, and a subsequent arrangement of turbine blades 24 projecting outwards from a rotatable hub 27. The compressor drum or compressor disk 26 and the blades 22 arranged thereon, as well as the turbine rotor hub 27 and the turbine rotor blades 24 arranged thereon rotate about the engine axis 1 during operation.

FIG. 2 shows a side view of a fan 12 with fan blades 30, where a pitch angle is shown which is variable, as is described in the following. The pitch angle is variable, for example, in a range from 46° to 51°.

FIG. 3 shows the principle of the solution in accordance with the invention. The reference numeral 29 shows a hub 29 at the front in the flow direction (the inflow in the illustrations of the figures in each case is from the left), said hub being provided with axial first guide recesses or guideways 33. An adjusting disk 32 is arranged in the flow direction behind the hub 29 and is provided with second guide recesses or guideways 34 arranged at an angle to the engine axis 1. A blade root 31 of the fan blade 30 is mounted at its front area in the respective first guide recess or guideway 33, while its rear area is mounted in the second guide recess/guideway 34. Hence a rotation of the fan blade 30 about a radial axis vertical to the engine axis 1 takes place with an axial displacement of the adjusting disk 32. The position of this radial swivel axis is substantially in the plane of the hub 29, depending on the respective detailed design.

FIG. 4 shows a perspective view of a first exemplary embodiment. The hub 29 is firmly connected to a shaft 42 rotatable about the engine axis 1 and has a bearing flange 41 to which an inflow cone can be fastened. The shaft 42 is mounted using a bearing 43.

The adjusting disk 32 is non-rotatably connected to the hub 29. This is done using pins 44 arranged in recesses of the hub 29 or of the adjusting disk 32. The adjusting disk 32 is mounted using a bearing 38 on a bearing casing 45. The latter has feed lines and return lines for the bearing oil, as will be described in the following.

FIGS. 5 and 6 show two different operating states of the arrangement shown in FIG. 4. In FIG. 5, the adjusting disk 32 is moved towards the right, as is shown by the arrows. Since the bearing 38 is connected axially fixed to the adjusting disk 32, a higher oil pressure in a chamber 46 effects a displacement of the bearing 38 and hence of the adjusting disk 32 towards the right.

The reference numerals 48 and 49 respectively indicate oil feed and oil return for lubrication of the bearing 43.

FIG. 6 shows in comparison with FIG. 5 an operating state in which the adjusting disk 32 is moved into its leftward-facing position. This movement is achieved by a pressure buildup in a chamber 47 of the piston/cylinder arrangement 37. In the exemplary embodiment, the chambers 46 and 47 are for example each connected to return lines provided with shut-off elements or valves in order to attain the required operating states. It is however also possible to connect the chambers 46 and 47 to separate bearing oil feed lines and to control them accordingly for actuating the piston/cylinder arrangement.

In the exemplary embodiment shown in FIGS. 3 to 6, the blade root 31 has in each case a first bearing element 35 and a second bearing element 36 arranged in the first guide recess/guideway 33 and in the second guide recess/guideway 34, respectively. The figures do not show this in detail, instead the design of the bearing elements 35 and 36 is shown in detail in FIG. 7, but can be transposed to the exemplary embodiments of FIGS. 3 to 6.

FIG. 7 shows a further exemplary embodiment of the invention. In addition to making clear the design of the first and second bearing elements 35 and 36, it shows closure rings 50 and 51 which close the guide recesses 33 and 34 (guideways) and secure the bearing elements 35 and 36. The latter are designed as spherical elements which are mounted on a reduced-diameter area on the blade root 31. Accordingly, the guideways 33 and 34 are designed with undercuts.

In the exemplary embodiment shown in FIG. 7, a bearing oil feed line 39 is provided which issues into the centric area of the bearing 38. The two chambers 46 and 47 are each connected to one of two bearing oil return lines, inside which shut-off elements 52 and 53 are arranged. Suitable actuation of the shut-off elements 52 and 53 thus results in an axial displacement of the adjusting disk 32.

LIST OF REFERENCE NUMERALS

1 Engine axis
10 Gas-turbine engine
11 Air inlet
12 Fan rotating inside the casing
13 Intermediate-pressure compressor
14 High-pressure compressor
15 Combustion chambers
16 High-pressure turbine
17 Intermediate-pressure turbine
18 Low-pressure turbine
19 Exhaust nozzle
20 Guide vanes 21 Engine casing
22 Compressor rotor blades
23 Stator vanes
24 Turbine blades
26 Compressor drum or disk
27 Turbine rotor hub
28 Exhaust cone
29 Hub
30 Fan blade
31 Blade root
32 Adjusting disk
33 First guide recess/guideway
34 Second guide recess/guideway
35 First bearing element
36 Second bearing element
37 Piston/cylinder arrangement
38 Bearing
39 Bearing oil feed line
40 Bearing oil return line
41 Bearing flange
42 Shaft
43 Bearing
44 Pin
45 Bearing casing
46 Chamber
47 Chamber
48 Oil feed
49 Oil return
50 Closure ring
51 Closure ring
52 Shut-off element
53 Shut-off element

What is claimed is:

1. An aircraft gas turbine comprising:
a fan rotatable about an engine axis in an inflow region of the aircraft gas turbine, the fan including:
a hub rotatable about the engine axis;
an adjusting disk rotational fixed with respect to the hub;
one of he adjusting disk and the hub being axially displaceable relative to the other
a plurality of fan blades, each fan blade including a blade root having a front area offset forward of a radial axis of the fan blade with respect to a flow direction through the fan and a rear area offset rearward of the radial axis of the fan blade with respect to the flow direction through the fan; each fan blade being moveably mounted at the front area to one of the hub and the adjusting disk and at the rear area to another of the hub and the adjusting disk, a pitch angle of the fan blades being variable by the axial displacement of the one of the adjusting disk and the hub relative to each other;
wherein the axial displacement causes each fan blade to pivot around at least one chosen from the front area and the rear area, offset from the radial axis of the fan blade.

2. The aircraft gas turbine in accordance with claim 1, wherein the hub includes first guide recesses and the adjusting disk includes second guide recesses, with the front areas of the blade roots mounted to the first guide recesses and the rear areas of the blade roots mounted to the second guide recesses.

3. The aircraft gas turbine in accordance with claim 1, wherein the hub includes first guideways substantially arranged in a direction of the engine axis and the adjusting disk includes second guideways inclined with respect to the engine axis, with each blade root being mounted in a first and a second guideway.

4. The aircraft gas turbine in accordance with claim 3, wherein each blade root includes, in the flow direction, a first front bearing element arranged in the first guideway and a second rear bearing element arranged in the second guideway.

5. The aircraft gas turbine in accordance with claim 4, wherein the bearing elements are shaped as undercut substantially spherical heads that are displaceable in the guideways, and wherein the guideway are shaped as undercut grooves.

6. The aircraft gas turbine in accordance with claim 1, and further comprising a piston/cylinder arrangement for moving the adjusting disk.

7. The aircraft gas turbine in accordance with claim 6, wherein the piston/cylinder arrangement is formed by at least one bearing, and includes at least one bearing oil feed line and at least two bearing oil return lines.

8. The aircraft gas turbine in accordance with claim 7, wherein the bearing is axially moveable, forming a double-acting piston of the piston/cylinder arrangement.

9. An aircraft gas turbine comprising:
a fan rotatable about an engine axis in an inflow region of the aircraft gas turbine, the fan including:
a hub rotatable about the engine axis;
an adjusting disk rotationally fixed with respect to the hub;
one of the adjusting disk and the hub being axially displaceable relative to the other;
a plurality of fan blades, each fan blade including a blade root having a front area with respect to a flow direction through the fan and a rear area with respect to the flow direction through the fan; each fan blade being moveably mounted at the front area to one of the hub and the adjusting disk and at the rear area to another of the hub and the adjusting disk, a pitch angle of the fan blades being variable by the axial displacement of the one of the adjusting disk and the hub relative to each other;
a piston/cylinder arrangement for moving the one of the adjusting disk and the hub relative to each other; wherein the piston/cylinder arrangement is formed by at least one bearing, and includes at least one bearing oil feed line and at least two bearing oil return lines.

10. The aircraft gas turbine in accordance with claim 9, wherein the bearing is axially moveable, forming a double-acting piston of the piston/cylinder arrangement.

* * * * *